G. E. KELLAR.
WATER GATE.
APPLICATION FILED JUNE 30, 1909.
967,524.
Patented Aug. 16, 1910.
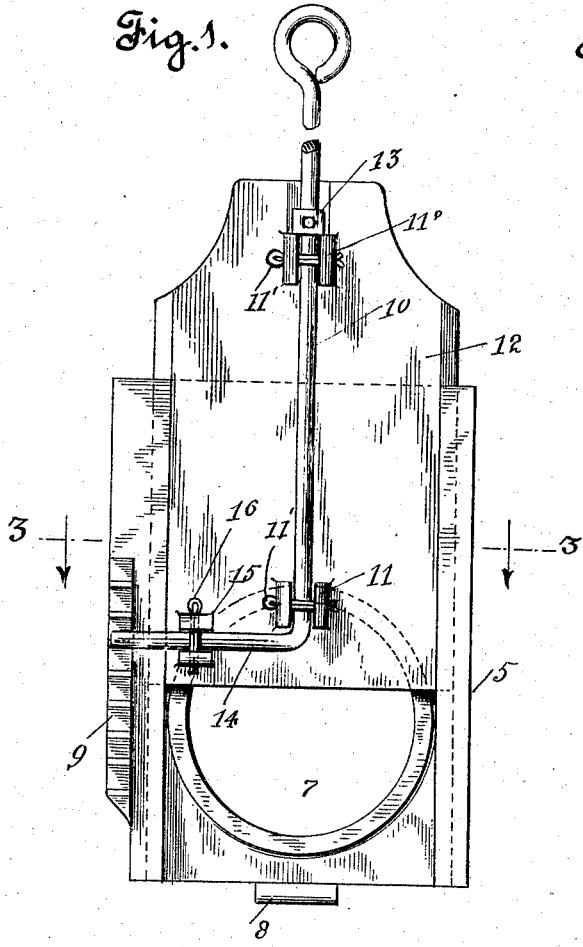
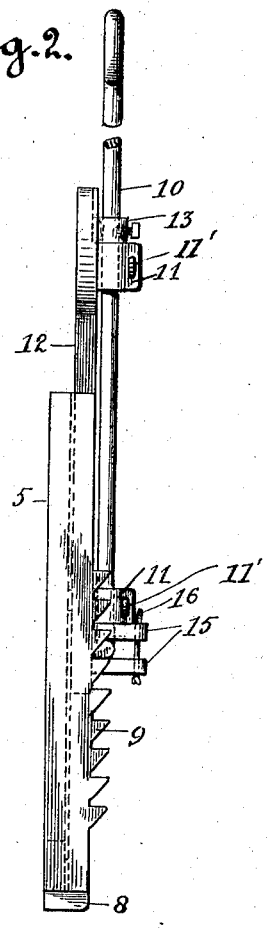
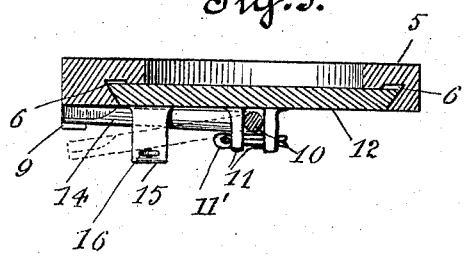
Witnesses,
Inventor,
George E. Kellar,
Attorneys

UNITED STATES PATENT OFFICE.

GEORGE E. KELLAR, OF COVINA, CALIFORNIA, ASSIGNOR TO KELLAR-THOMASON MANUFACTURING COMPANY, OF COVINA, CALIFORNIA, A CORPORATION OF CALIFORNIA.

WATER-GATE.

967,524.  Specification of Letters Patent.  Patented Aug. 16, 1910.

Application filed June 30, 1909.  Serial No. 505,153.

*To all whom it may concern:*

Be it known that I, GEORGE E. KELLAR, a citizen of the United States, residing at Covina, in the county of Los Angeles and State of California, have invented new and useful Improvements in Water-Gates, of which the following is a specification.

My invention relates to water gates employed in water flumes and water pipe lines, and more particularly to a mechanism for lowering and elevating the gate to and from its seat on the gate frame, and a main object is to provide a simple and efficient mechanism, whereby the gate may be quickly placed and held in any desired position in the gate frame without the employment of a locking device.

In the accomplishment of the above objects, I preferably employ the usual metallic gate frame provided with an aperture and a gate vertically movable therein.

My improved operating mechanism consists of a rack formed integrally with the frame at one side thereof, and a rotative rod secured to the center of the gate, its end engaging the rack.

In the drawings attached hereto and forming a part of this specification:—Figure 1— is a face view of the gate provided with my improved operating mechanism, the gate being in a partially raised position. Fig. 2— is a side elevation of the gate shown in Fig. 1, the gate being in the same position. Fig. 3— is a cross section taken on line 3—3 of Fig. 1, the position of the dog when not engaging the toothed rack being shown in dotted lines.

Referring to the drawings, 5 indicates the gate frame, rectangular in configuration, provided with a vertical guideway 6 at either side thereof and having a centrally disposed aperture 7 therein in the lower portion thereof, a gate stop 8 being secured to the lower horizontal edge of the frame. Disposed at one side of the gate frame and preferably formed integrally therewith is a vertically disposed rack bar 9, adapted to be engaged by the horizontally disposed portion 14 of a vertically disposed rod 10 mounted between bearing lugs 11 and held in detachable relation to the gate by cotter pins 11'. The end 14 of the rod that engages the rack passes between bearing lugs 15 that project at right angles to the face of the gate, a vertically extending cotter pin 16 limiting the outward movement of the horizontally disposed portion of rod 10.

It will be apparent from the above construction that gate 12 may be readily raised or lowered as occasion demands by simply rotating rod 10 to throw the end 14 out of engagement with the rack. If for any reason the rod 10 should become broken the method of mounting it on the gate renders its detachment a simple matter. It will also be observed that I have provided a simple and efficient operating mechanism for gates of the herein described type, that will effectually do away with any locking mechanism, thus rendering the gate easy of operation, it being understood that the pressure of the water through the pipe is always against the gate.

Having described my invention what I claim as new and desire to secure by Letters Patent is:—

1. In a water gate, a frame provided with an opening therein and having a flanged guideway on either side of the opening, a gate vertically movable in said guideways, a rack secured to one side of the frame, and a dog secured to said gate and adapted to be thrown into or out of engagement with said rack.

2. In a water gate, a frame provided with vertically disposed guideways and having an opening therethrough adjacent the lower end thereof, a gate movable in said guideways, a toothed rack on one side of said frame, and a vertically disposed operating rod mounted in bearings secured to said gate, the lower end of said rod adapted to be thrown into or out of engagement with said rack.

3. In a water gate, a frame provided with flanged guideways and having an opening therethrough, a closure for said opening movable in said guideways, a plurality of notches formed on one side of the frame, and a vertically disposed operating rod mounted on said gate, the lower end of said rod engaging said notches formed on said frame.

In witness that I claim the foregoing I have hereunto subscribed my name this 21st day of June, 1909.

GEORGE E. KELLAR.

Witnesses:
EDMUND A. STRAUSE,
MYRTLE A. PALMER.